United States Patent [19]

Wysk

[11] Patent Number: 4,530,291

[45] Date of Patent: Jul. 23, 1985

[54] SEPARATING SPENT AND UNREACTED PARTICLES OF CALCIUM-BASED SULFUR SORBENT

[75] Inventor: Stanley R. Wysk, Suffield, Conn.

[73] Assignee: Combustion Engineering, Inc., Windsor, Conn.

[21] Appl. No.: 535,177

[22] Filed: Sep. 23, 1983

[51] Int. Cl.[3] ............................ F23B 7/00; B01J 8/24; B03C 1/26; B03C 7/12

[52] U.S. Cl. .................................... 110/342; 110/344; 110/345; 110/245; 209/127.1; 209/214; 209/215; 423/244

[58] Field of Search ............... 204/186, 302, 164, 173, 204/174, 179, 180 R, 299 R; 423/244 A, 244 R, 242 A; 210/222; 209/214, 215, 127 R, 127 A, 127 C, 127 B; 110/345, 245, 342, 347, 314

[56] References Cited

U.S. PATENT DOCUMENTS

| | | | |
|---|---|---|---|
| 3,960,687 | 6/1976 | Bakke et al. | 204/174 |
| 4,078,041 | 3/1978 | Morris | 423/244 A |
| 4,254,557 | 3/1981 | Mayer et al. | 423/244 R |
| 4,254,558 | 3/1981 | Mayer | 423/244 R |
| 4,329,324 | 5/1982 | Jones | 110/345 |

*Primary Examiner*—John F. Niebling
*Assistant Examiner*—B. J. Boggs, Jr.
*Attorney, Agent, or Firm*—Arthur L. Wade

[57] ABSTRACT

A fluidized bed combustor is utilized as a source of drains, including spent calcium-based sorbent. The reacted sorbent is broken to expose unreacted portions which can be recycled to capture additional sulfur compounds. A separation is provided by a magnetic separator and an electrophoretic separator in order to obviate the load of recycling reacted sorbent and other waste material having no calorific value.

7 Claims, 4 Drawing Figures

SEPARATING SPENT AND UNREACTED PARTICLES OF CALCIUM-BASED SULFUR SORBENT

TECHNICAL FIELD

The present invention relates to the separation of unutilized portions of calcium-based sorbents and recycling only these unreacted particles into contact with sulfur oxides. More particularly, the invention relates to extracting calcium-based sorbent from a first stage of contact with sulfur oxides in a process, comminuting the sorbent particles to expose the unreacted portion, separating the unreacted portion from the spent particles by physically generated forces, and recycling only the unreacted particles into contact with the sulfur oxide.

BACKGROUND ART

This invention is related to that disclosure in U.S. Pat. No. 4,329,324 to Brian C. Jones, issued May 11, 1982. Inevitably, the present disclosure will be comparable to that of the Jones patent. A serious student of this art should study the Jones patent as background.

The ever-growing public awareness of the environment has led to the enactment of legislation at the national, state, and local levels directed at preserving our environment for future generations. Particular attention has been given to sulfur dioxide emissions resulting in the promulgation of federal regulations severely restricting emissions of sulfur dioxide from any process producing these oxides as by-products. The flue gas generated during the combustion of fossil fuel is an example of such processes. One way to avoid these emissions in fossil fuel combustion is to burn only fossil fuels with low sulfur content, such as natural gas and light oils. However, the scarcity of the known domestic reserves of low-sulfur oil and natural gas, coupled with the high cost of foreign supplies of such fuels, precludes the burning of these clean fuels as a viable solution to our air pollution problem.

Domestic supplies of coal are, on the other hand, abundant. Estimates have been given that domestic supplies of coal could satisfy our nation's energy need for the next two to three hundred years. Unfortunately, coal is not a clean-burning fuel as is natural gas or low-sulfur oil. Coals found in the United States typically contain sulfur in amounts ranging from about 100 to 1300 nanograms per Joule of heating value. Since any sulfur contained in the coal would, when combusted in the same manner as a clean fuel, be readily converted to sulfur dioxide and emitted to the atmosphere, much attention has been directed to developing methods of burning sulfur-containing fuels such as coal, while at the same time preventing pollution of the atmosphere with sulfur dioxide. As a result, interest has been rekindled in the burning of coal, and in addition, to the use of calcium-based sorbents such as limestone for $SO_2$ removal.

The great potential for minimizing emissions of sulfur dioxide to the atmosphere when burning sulfur-containing fuels such as coal in a fluidized bed of sulfur oxide sorbent, has been recognized for some time. For example, British Pat. No. 824,883, issued in 1959, discloses burning a sulfur-containing solid fuel in a fluidized bed of sulfur sorbent such as limestone or dolomite.

In the typical present-day fluidized bed boiler, particulate coals having a larger size ranging from 3.0 to 6.5 millimeters are typically fed to and combusted with a fluidized bed of comparable sized limestone particles at a relatively low temperature of 760 C. to 925 C. under oxidizing conditions. During combustion within the bed, a major portion of the sulfur dioxide generated reacts with the limestone within the bed, thereby forming calcium sulfate which is retained within the bed. Typically, calcium utilization at these conditions is about 20 to 35 percent. Calcium utilization is defined as the overall fractional conversion of available calcium sorbent in the limestone to calcium sulfate via reaction with sulfur dioxide generated during the combustion of a sulfur-containing fuel within the bed. Limestone must be continually fed to the bed at a rate sufficient to maintain the calcium to sulfur mole ratio, defined as the ratio of moles calcium in the limestone feed to moles sulfur in the coal feed, from two-to-one to four-to-one in order to maintain an acceptable sulfur dioxide retention within the bed.

A number of approaches have been suggested for improving calcium utilization in the limestone bed. One approach has been to use extremely fine limestone having a particle size passing a 325 mesh screen, i.e., having a maximum particle size of about 40 microns, as the sulfur absorbing compound within the fluidized bed. However, this approach poses serious problems relating to material handling and, in particular, to increased dust loading when the flue gas is leaving the fluidized bed. In fact, one air pollution problem is substituted for another. That is, a sulfur dioxide emission problem is eliminated; but a particulate emission problem is created. Because of their small size, such fine limestone particles are readily blown upward out of the bed by the fluidizing air which is maintained at a velocity high enough to fluidize the coarser coal particles. As a result of this elutriation of the fine limestone particles from the bed, elaborate and very expensive dust collection equipment must be provided to remove the fine limestone particles from the flue gas prior to venting this flue gas to the atmosphere.

Another approach has been to provide a system for removing the spent sulfur oxide sorbent from the bed and treating it to regenerate its sulfur oxide adsorbing capability. One such regeneration system is illustrated in U.S. Pat. No. 3,717,700 wherein the bed drain material, which includes ash, unburned carbon and spent limestone particles, is heated in a slightly oxidizing atmosphere in a second fluidized bed with a carbonaceous fuel to a temperature in the range of 925 C. to 1150 C. to drive off the sulfur retained by the sorbent as $SO_2$, thereby regenerating the sulfur oxide sorption capability of the sorbent. Other known schemes for regenerating the spent sorbent also require heating the spent sorbent in either a reducing or an oxidizing atmosphere. Such regeneration processes all share one major drawback—the energy consumption required to drive off the absorbed sulfur from the spent sorbent. Additionally, the absorbed sulfur is typically driven off as $SO_2$ or $H_2S$ gas which must be removed from the flue gas of the regeneration vessel by a process such as wet scrubbing before venting the flue gas to the atmosphere.

Other approaches which have been suggested include thermally pretreating the limestone before feeding it to the bed to increase its sulfur oxide sorption activity or adding other chemicals to the limestone bed to catalyze the sulfur oxide-calcium reaction. These approaches, however, have proven impractical economically and technologically.

Finally, there is the method advanced in the Jones Pat. No. 4,329,324. In that disclosure, the sulfated sorbent is crushed, pulverized, or comminuted to expose unreacted particles of the sorbent in the bed drain material and all the bed drain material is reinjected into the bed. The obvious disadvantage of recycling reacted material is inherently within the Jones process. A method and means is needed for separating the unreacted portion from the reacted portion and reinjecting only the unreacted portion into the bed.

Despite the foregoing specific concern with regeneration of spent sorbent in a coal combustion process, there is the more broadly based concern with adsorbent utilization in all processes where contact with sulfur oxides by the calcium-based sorbents takes place. In whatever process brings together sulfur oxide with calcium-based sorbents as a first stage, there follows the problem of exposing the unreacted particles of the sorbent and their subsequent separation from the spent particles. Only with such separation can the recycle of the unreacted particles of the sorbent in a second stage of exposure to the sulfur oxides be relieved of the burden of the spent particles of the sorbent. In shorter terms, there is need for separating spent sorbent from unreacted sorbent so the unreacted sorbent can be recycled and the spent sorbent disposed of as waste. As an example of processes alternate to fluid bed combustors, there is a dry scrubber where the calcium-based sorbent is injected in a gas stream, rather than in a fuel bed.

The technology having advanced to comminuting the partially sulfated calcium-based sorbent, the present invention shifts concern to separation of the spent particles from the unreacted particles of sorbent. It is recognized that among the problems of separating gases, solids, and liquids, the solid-solid separation looms as the more difficult to achieve. There are at least 3 forces which can be brought to bear upon the present solid-solid separation problem. Flotation is probably the more messy, involving the use of a liquid. The dry approach appears the more attractive. Two dry approaches which appear the more likely candidates utilize magnetic force and electrophoretic force. As both these dry processes can be traced to their electrical development, they will be classified for present purposes as electro-separation. There are, of course, differences between the two dry processes, but they have at least the common denominator in being electrically generated.

DISCLOSURE OF THE INVENTION

The present invention contemplates the adsorption of sulfur oxides by a calcium-based sorbent as a first step, followed by comminuting the partially spent particles of sorbent to expose particles of unreacted sorbent and separating the used and unused particles in order to recycle the unused particles into contact with the sulfur oxides in a second step, while the spent particles are rejected.

The invention further contemplates separating the reacted and unreacted particles of sorbent by the application of electrically generated forces.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Terms and Technology

Figure 1:
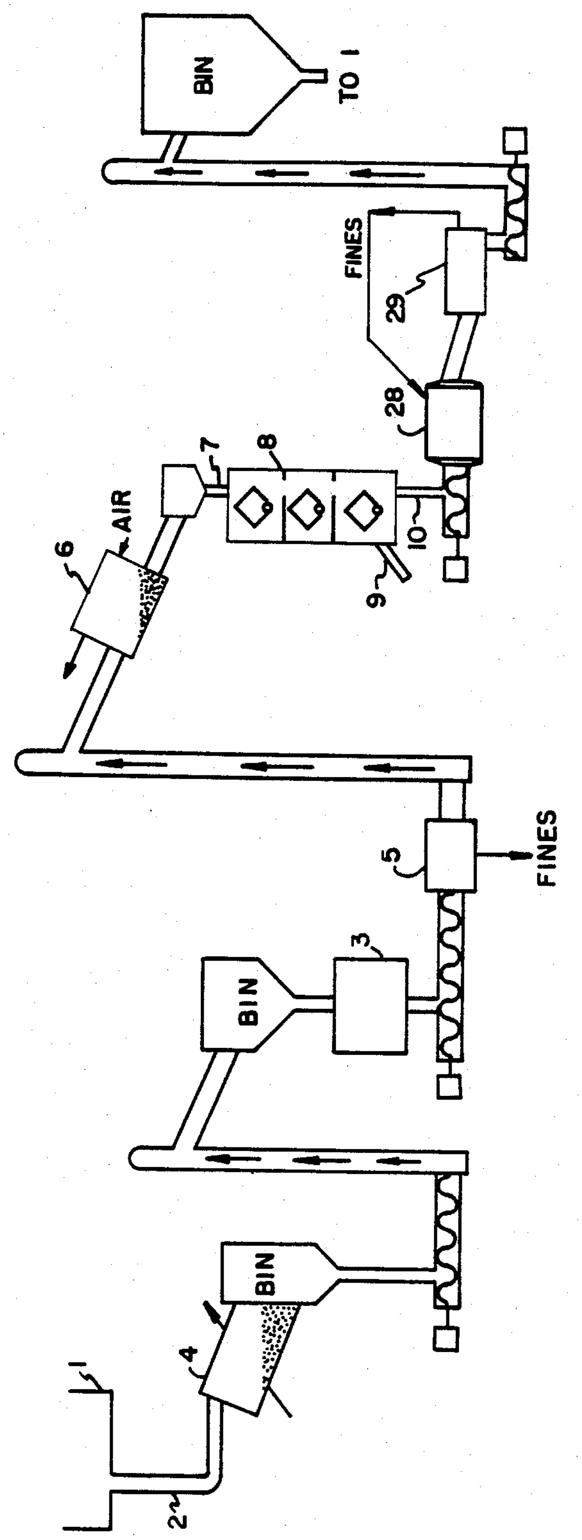
FIG. 1 is a diagrammatic representation of a fluidized bed system incorporating magnetic separation of bed drain solids for reinjection in accordance with the present invention.

An analysis of the nature of the sorption process is necessary for the complete understanding of this disclosure. Using any form of calcium as a sorbent of sulfur oxide in a fluidized bed has certain limitations established by the nature of the adsorbing process. The mechanism for sulfur oxide sorption by the sorbent particle is one of sulfation of the sorbent particle. The sulfation reaction takes place first at the surface of the particle and then progresses inward as the $SO_2$ diffuses into the particle through pore openings to the surface of the particle. As a consequence, particle reactivity with $SO_2$ falls off rapidly as a hard shell of sulfate is formed at and near the surface of the sorbent particle, thereby covering any remaining pore openings leading to the core of the particle. Thus, sorbent utilization is limited as the diffusion of $SO_2$ into the particle is inhibited by the formation of a sulfate layer at and near the surface of the sorbent particle.

As taught by at least the disclosure of the Jones patent, that internal portion of the sorbent unreacted can be made available by first breaking open each sulfated particle. Broken down into a sufficiently small size, the sorbent will have a first divisible portion of unreacted material and a second portion of reacted material divisible from the first portion. It is a function of the present invention to divide these two portions and recycle substantially only the unreacted particles of the sorbent to the bed for the continuing sorption of sulfur compounds.

The fluidized bed combustor, in its consumption of fossil fuel coal, is but one example of all processes which emit sulfur oxides as pollutants. Of course, this is so if coal, as representative of fossil fuel, contains sulfur compounds. It is present practice to mix a sorbent material with the coal to interface and react the sorbent with the sulfur compounds of the coal. It is then desirable to understand the results of this interface. First, the calcium-based sorbents are of primary consideration. If the subsequent disclosure utilizes the terms limestone or dolomite, it is to be understood that these materials are only representative of any calcium-based sorbent to be brought into interface with the sulfur compounds.

Next, it is to be understood that the calcium-based sorbent particle is porous in structure. The sulfur compound is "captured" by entering the pores of the sorbent particle, penetrating the particle surface to some extent. The sulfation of the sorbent particle continues until a hard shell of the resulting compound is formed which isolates additional sulfur oxides from contact with the core of the particle. Access to this core of the sulfated particle is obtained by comminuting the utilized sorbent particle in order to break out the core material for further use.

The Jones patent disclosure included comminuting sulfated sorbent particles. Jones then taught recycling all particles for interface between both the spent and unreacted particles of the sorbent. It is an object of the present invention to introduce a division or separation step and structure after the sorbent particles have been comminuted in order to isolate the used particles from the unused particles of sorbent. The unused particles of sorbent are, of course, the core material broken out of the sulfated sorbent.

The First Stage Of Sorption

Referring to FIG. 1, a source 1 is indicated for spent sorbent. For the purposes of the present disclosure, this source will be referred to as a fluidized bed combustor on which coal is consumed in intimate association with a calcium-based sorbent which will become spent by adsorption of the sulfur content of the coal. However, it is to be understood that any process in which calcium-based sorbent extracts sulfur compounds, such as a dry limestone scrubbing process, would serve as well. In all events, the spent sorbent is withdrawn from source 1 through conduit 2 as bed drains which will be processed by the invention.

As the coal particles are consumed, their particle size decreases and a certain amount of them become light enough to be blown out of the bed into a freeboard region by the fluidizing air. Some of these elutriated coal particles will fall back into the bed, others will be completely consumed within the freeboard region, and the remaining small portion will be entrained in the combustion flue gases along with other particulate matter, such as fly ash, and blown out of the boiler, heated by the bed combustion, through a gas outlet.

A dust collection train can be provided to remove the particulate matter entrained in the flue gases prior to venting the gases to a stack. This course particulate matter is comprised of the coarser fly ash particles and most of the unburned carbon particles elutriated from the bed. Therefore, this coarse particulate matter is recycled to the fluidized bed for combustion of the unburned particles included therein. The remainder of the dust collection train may comprise a bag filter and other equipment deemed to be economically feasible.

In order to maintain bed heights at a preselected level and to purge the bed of unnecessary material such as coal ash particles and spent limestone sorbent, it is customary to provide a bed drain system for continuously or periodically removing such material from the bed. The material removed through bed drain conduit 2 consists of coal ash particles, spent limestone sorbent, and some unburned carbon particles termed char.

It has been the practice to dispose of all the bed drain solids as undesirable waste. More recently, however, attention has been given to processing the bed drain solids to recover the unreacted limestone and/or the unburned char contained therein. The particulate material termed bed drain solids is comminuted by means such as a crusher 3 to reduce the size of the spent limestone particles. In comminuting the bed drain solids, the sulfate layer on the limestone particles is fractured and "peeled off", thereby exposing the unreacted limestone surface of the core of the original particle.

The present method and apparatus, in its second stage of sorption, makes the unused core of the sorbent particle available as taught by the Jones patent disclosure.

However, the present disclosure now teaches to separate and isolate the available unreacted core material of the sorbent particles from the spent shells of the particles in order to inject only the unreacted material back into the fluidized bed for the second stage. It is within the scope of the present invention to apply magnetic or electrophoretic forces to divide the unreacted portion of the sorbent material from the bed drains.

Magnetic Separation

High Gradient Magnetic Separation (HGMS) has recently been applied as a technique for desulfurization and deashing of fine coal in wet slurries. The concept has been successfully implemented in the removal of pyrite from raw coal as a step in coal beneficiation. U.S. Pat. No. 4,209,394, issued to D. R. Kelland June, 1980, discloses such a device for magnetic separation of slurries. The best separations have been made in water slurries, although success has been achieved by dry processing. The major objection to wet processing is the energy requirement for drying, or the energy loss if the material is subsequently processed wet.

The application of High Intensity Magnetic Separation to mineral mixtures containing calcium is an advanced technology concept. The magnetic forces that need to be exerted in these mixtures is quite high since the sulfur-bearing component $CaSO_4$ is only feebly magnetic. The material from which $CaSO_4$ is to be separated in a desulfurization process normally contains calcium oxide and carbon, neither of which respond to a magnetic field. Both of these compounds are, of course, important chemicals to recover, calcium oxide for its sulfur-retaining property, and carbon for its calorific value.

The principal stream containing sulfated sorbent is discharged from its source 1 through conduit 2 as bed drains. The solids are at bed temperature (1300 to 1700 F.) and are sent through a cooler 4 for recovery of any available sensible heat. The solids then are fed to crusher 3 in which the cooled bed drain material is pulverized to about −65 mesh and screened at 5. The fines are discharged at this point in the processing train since their presence inhibits the subsequent separation. Fines have an adverse affect on dry magnetic separation, as they apparently cause a degree of stickiness which causes particles to adhere to each other. The screened mixture is then air dried at 6 and injected through conduit 7 into an induced-roll separator 8. Separator 8 is a high-intensity, dry magnetic separator which removes sulfated calcium and certain other minerals from the mixed solids. As shown in Table 1 below, $CaSO_4$ is classified as feebly magnetic with a relative attractability of approximately 0.038. On the other hand, $Ca(OH)_2$, graphite, and CaO are considered non-magnetic and diamagnetic with relative attractabilities that are sufficiently different from $CaSO_4$ to enable a selective separation.

TABLE 1

| Mineral | Group | Relative Attractability |
|---|---|---|
| Iron | Ferro Magnetic | 100.00 |
| Gypsum | Weak to Feebly Magnetic | .038 to .016 |
| Calcite | Non-magnetic | .0004 |
| Portlandite | Diamagnetic | −0.029 |
| Graphite | Non-magnetic | 0.000 |

Figure 2:
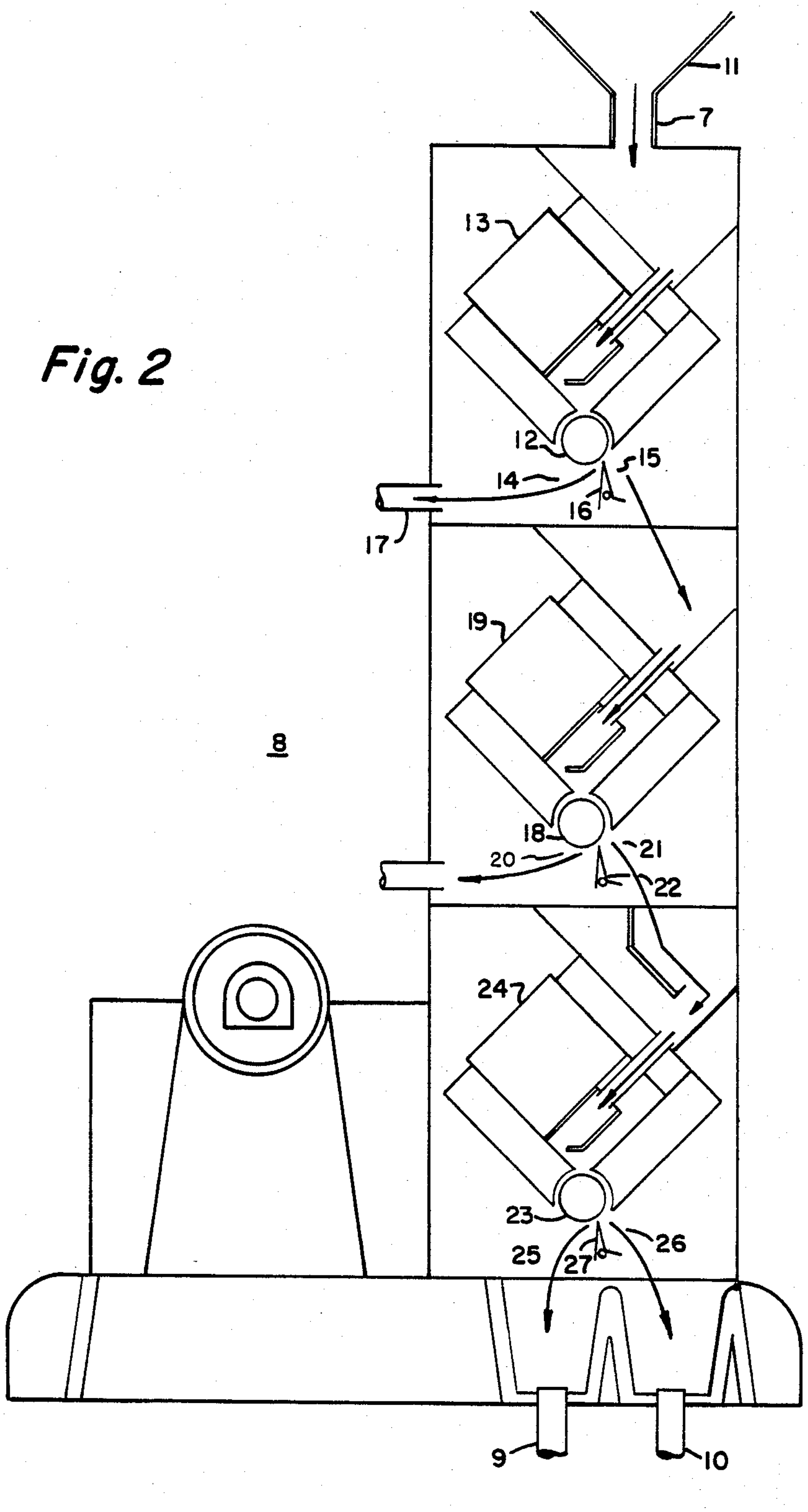
FIG. 2 is a sectioned elevation of the 3-stage magnetic separator of FIG. 1.

Separator 8 is depicted as an induced-roll magnetic separator, as shown in FIG. 2. The separator is a gravity-fed selective concentrator for mineral solids. It provides sharper separation than direct lift separators. It can be designed in many different roll combinations depending on the difficulty of the separation to be performed. In separator 8, the magnetics are removed and discharged from the system as waste through conduit 9, while the nonmagnetics are recovered for further processing through conduit 10. It should be noted that certain mineral matter contained in coal will also be present in the raw mixture, and much of this material (such as magnetite) will be separated with the magnetics and discharged. The tailings and concentrate are both weighed and analyzed before further processing. It is possible that selectivity can be improved in separator 8 by employing pretreatment procedures, such as use of the so-called magnetic fluids. This technique affects the chemical structure of the solid material to produce sharper separations with lower field intensity. However, because of the energy requirement, dry processing is the preferred technique.

Referring to FIG. 2, the solids mixture enters the magnetic separator 8 by means of gravity feed from bin 11 which is supplied through input conduit 7. The mixture from bin 11 is first passed over a low intensity scalper roll 12 to separate out any highly magnetic materials that may be present. The electromagnet 13 induces magnetic fields around local regions of roll 12 as the mixture is fed at a controlled rate. The magnetized particles are attracted to roll 12, and are carried to a region 14 of lower intensity where they either fall off or are brushed from the roll. The nonmagnetized particles which are unaffected by the field, follow a natural path from roll 12 into a separate zone 15 partitioned by a splitter 16. The magnetic particles are drawn from zone 14 and discharged from the system to waste through conduit 17.

The nonmagnetized particles emerging from zone 15 fall to a lower section containing a high intensity magnetic roll 18 where weakly magnetic particles are separated from nonmagnetic particles. Here the principal of separation is the same as scalper roll 12, except that the electromagnet 19 induces a high intensity magnetic field, which is suitable for separating out weakly and feebly magnetic solids. In this section, $CaSO_4$ (feebly magnetic) is separated and discharged from the unit through zone 20, while carbon and unutilized calcium (nonmagnetic) fall naturally to a separate zone 21, divided from the first zone 20 by a splitter 22. The nonmagnetic material is then passed to a second high intensity roll 23 in series for further concentration.

Again, an electromagnet 24 induces a high intensity magnetic field around local regions of roll 23 to separate out weakly and feebly magnetic solids. In this section, any remaining $CaSO_4$ (feebly magnetic) is separated and discharged from the unit through zone 25, while carbon and unutilized calcium (non-magnetic) fall naturally to a separate zone 26, divided from zone 25 by a splitter 27.

While all the waste accumulations in zones 14, 20 and 25 can be directed into conduit 9 to flow from separator 8 to waste or recycle as desired, the cumulatively refined unreacted sorbent and carbon from the third stage zone 26 is discharged to conduit 10, where the material is weighed and analyzed.

Before the recycle sorbent can be reinjected, the particles must be agglomerated until the particle size distribution is comparable to that of the fresh sorbent material. This is necessary to maintain the same fluidization performance within the bed and to minimize particle elutriants. Agglomeration of these solids can be performed in a disc pelletizer 28 with a screen classifier 29 which is connected to separator 8 through conduit 10. Pellets made in a disc are generally much more uniform in size than from a drum. The classifier 29 separates fines for recycle back to pelletizer 28. If a binding agent is required, it is anticipated that water can be used. The agglomerated particles then are stored and combined with the fresh sorbent.

The advantages of this concept are as follows: (1) sorbent utilization can be improved significantly; it is anticipated that approximately 80% or more of the nonsulfated calcium can be separated magnetically for recycle. This potentially could reduce the Ca/S mole ratio to 1.6/1.0 or less; (2) since the bed drain contains some unburned carbon which is recycled, the total carbon loss is reduced; (3) the magnetic separation is performed "dry", which means that no latent heat losses are involved; (4) the power requirements to perform the separation are quite low, for example, assuming that the required strength for the electromagnet is 15,000 gauss, the coal would need only about 1200 watts to process one ton of material per hour; (5) higher bed temperatures may be possible without increasing the sorbent feed rate; and (6) the separation step reduces the solids throughput of the recycled material and increases system capacity.

In summary, the present concept offers many advantages over conventional once-through sorbent feed systems in AFBC combustors. If the process performs as expected, large reduction in sorbent feed is possible, resulting in a significant increase in plant efficiency, particularly when using eastern coals. It is again noted that this concept can also be applied to dry scrubbers as well as fluidized bed units. As a matter of fact, it is to be again emphasized that the fluidized bed combustor process is here only representative of any environment in which sulfur oxides are brought into contact with calcium-based sorbent to capture the sulfur compounds and prevent their discharge as a pollutant.

Ionic Separation

Figure 3:
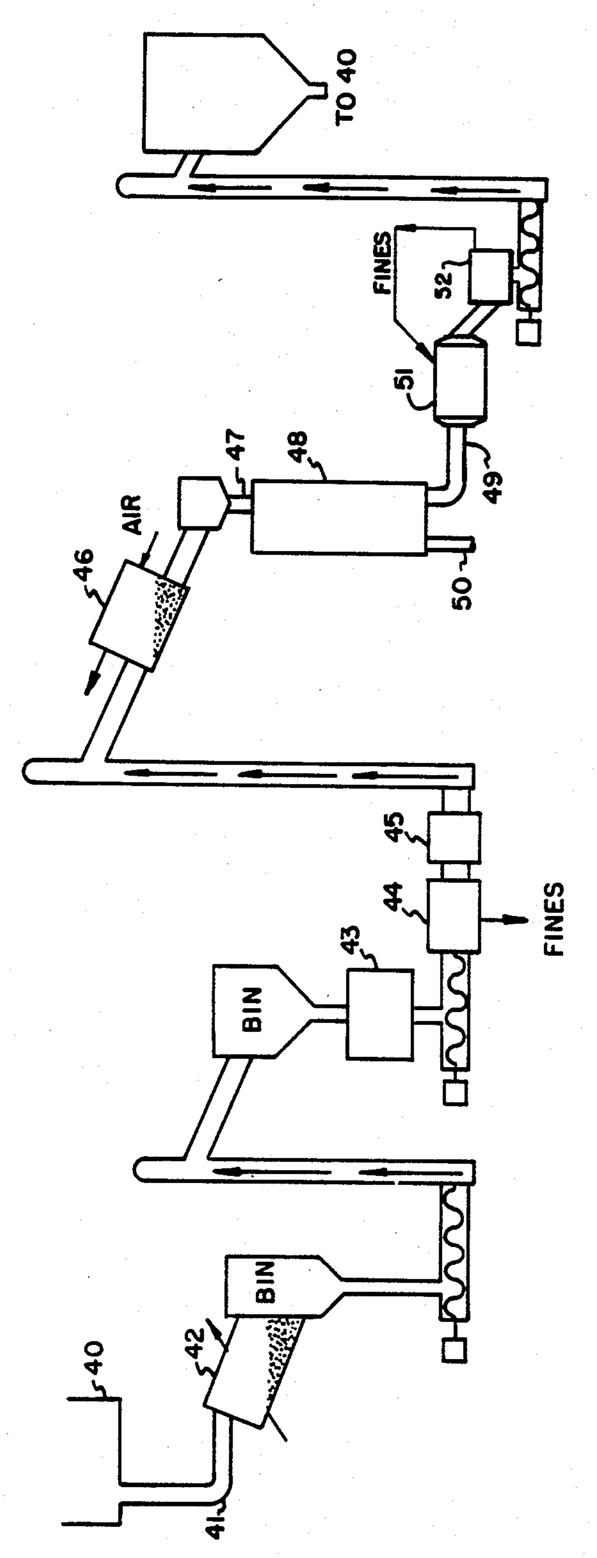
FIG. 3 is a system similar to the system of FIG. 1 but including an electrophoretic separator.

Separation of the comminuted spent and unreacted sorbent particles is not limited to magnetic separation. Another electrically generated force used for separation is that of electrophoresis. FIG. 3 illustrates a unique method of processing spent limestone and separating the nonsulfonated calcium electrophoretically. The principle of electrophoretic separation is based upon the known mechanism that, if one or more materials in a granular mixture can receive a surface charge before entering an electrostatic field, the particles of that material will be attracted to one of the electrodes and repelled from the other, depending upon the sign of the charge. By causing these particles to fall into separate chambers, a physical separation can be effected.

The electrical properties of solids and their ability to pick up an electric charge depend on the internal structure of the particles and physical characteristics such as pores and fissures. They also depend on the properties of the material substance of which the particles are composed, viz, metal, semiconductor, or insulator. The surfaces of particles give rise to a mechanical force when placed in an electric field. This effect is the basic phenomenon of electrophoresis.

Separation of solids by this mechanism is relatively new when performed in a dry medium. Sodium chloride and sodium sulfate have been recently separated by this concept. To perform a satisfactory separation, the materials in the mixture must consist of mostly discreet particles whose dielectric constants vary sufficiently. For this particular application, the materials to be separated are $CaSO_4$ from CaO and carbon.

The dielectric constants of the key compounds in a limestone-based desulfurization process are as follows:

| | |
|---|---|
| Carbon | <81 |
| Calcium Oxide | 8.5 |
| Calcium Sulfate | 5.6 |

To obtain a high single-pass separation efficiency between calcium oxide and calcium sulfate, it is necessary to alter the surfaces of these particles with a surface conditioner. Oils, fatty acids, and amines are known to be effective surface agents in mineral mixtures, and several such reagents from these chemical families are expected to provide satisfactory results.

Referring to FIG. 3, the material to be processed in this case is the stream of bed drains similar to the material from conduit 2 of FIG. 1. In FIG. 3, a fluidized bed combustor 40 is indicated as similar to combustor 1 of FIG. 1. Although, here again, other processes which intimately associated calcium-based sorbent with a source of sulfur compounds could be used. Bed drains containing spent and unused calcium-based sorbent and material with recoverable calorific value are withdrawn through conduit 41 and are to be processed into a separator which will divide the recoverable material from waste material. The only difference between the two figures is the processing trains receiving the bed drain material and delivering it to the separators, magnetic in FIG. 1, and electrophoretic in FIG. 3.

The bed drain mixture contains mostly CaO and $CaSO_4$, a lesser amount of mineral matter (ash), and a small amount of unburned char. The mixture is cooled, crushed, and screened, as in FIG. 1. In FIG. 3, the bed drains pass through cooler 42, crusher 43, and are screened at 44. The material is then delivered to a mixing vessel 45 where the surface-conditioning agent, such as oils, acids, or amines, is introduced. The coated mixture is then air-dried at 46 and passed through conduit 47 into separator 48 where the physical separation is performed. The separation of calcium oxide may require several passes through the separator to obtain the degree of separation required. Carbon and unutilized calcium is discharged through conduit 49, while waste is discharged through conduit 50. The recovered material in conduit 49 is passed to pelletizer 51 where it is resized to suit the requirements of the fluidized bed combustor. In the screen classifier 52, the undersized particles (fines) are recycled back to the pelletizer. The agglomerated particles are then conveyed to storage and eventually mixed with fresh sorbent.

Ion bombardment is the proposed method of charging these particles in separator 48. This mechanism utilizes the discharge of ions from a beamed electrode, as will be shown in FIG. 4, producing a corona while simultaneously concentrating a beam of ions in a given direction. When a dielectric particle and conductive particle are sent through the path of these ions, the surfaces take on a strong charge. On the conductor, this charge dissipates instantaneously, while the nonconductor retains its charge. When a group of the particles is placed on a grounded surface in the path of this field, the conductors will be released from the ground as the charge is transmitted to the ground. The dielectric particles cannot transfer their charge and are, therefore, held to the grounded surface.

Figure 4:
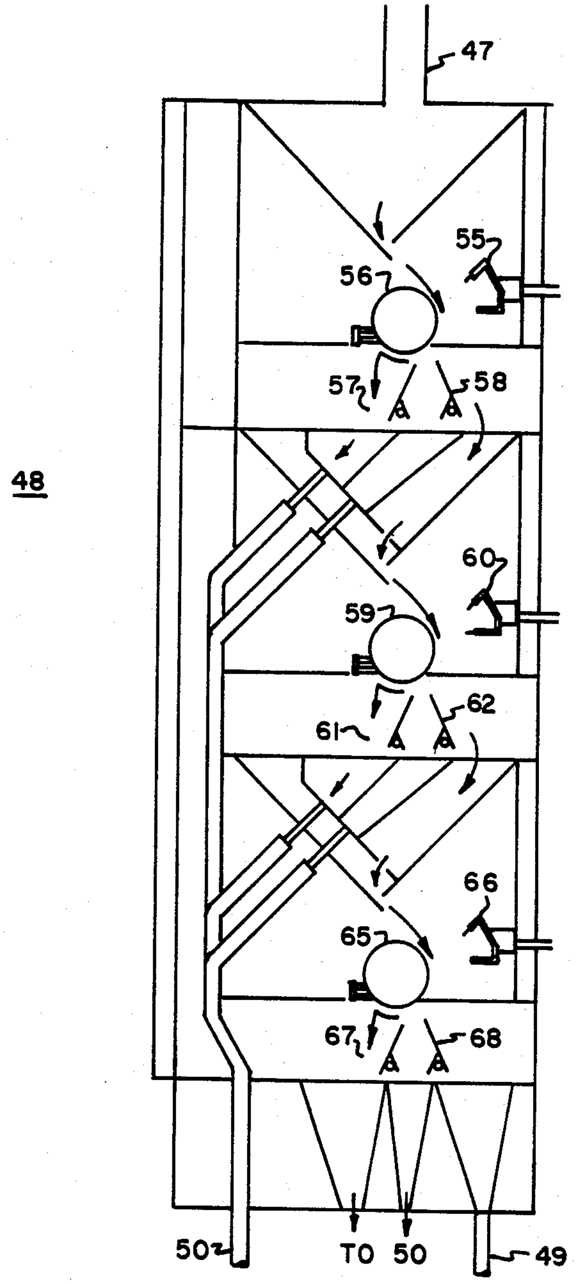
FIG. 4 is a sectioned elevation of the electrophoretic separator of FIG. 3.

The equipment to perform the separation can be a rotortype machine which performs the charging step during operation. The rotor is used to remove the ionic charge from the particles while acting as a grounded surface. The separator can be designed with several rotor units stacked vertically in series, as shown in FIG. 4.

The solids mixture enters the electrostatic separator 48 at the top by gravity feed from conduit 47. Referring to FIGS. 3 and 4, the particles are charged by a corona-emitting electrode 55 as they fall onto a rotor 56. On rotor 56, the conducting particles have their charge dissipated, enabling them to fall free. The nonconducting particles adhere to the grounded rotor 56 until they enter a separate region 57 partitioned by a splitter 58, where they are brushed from the rotor surface.

Carbon is easily separated from calcium oxide and calcium sulfate by the first rotor 56, since it has a much higher dielectric constant. However, the separation of calcium oxide from calcium sulfate will be more difficult and will require additional stages, as shown in FIG. 4. To obtain sharp separation of these compounds, two additional rotors are shown in series.

Second rotor 59 receives the conductive material from first rotor 56. Again, an electrode 60 is provided to emit a corona to charge the particles and cause those particles which are nonconductive to adhere to rotor 59 long enough to deposit them in region 61 defined by splitter 62. The recovered conductive material falls to a third rotor 65 where the refinement continues. Electrode 66 is provided for the corona, the nonconductive material adheres to the surface of rotor 65 long enough for deposit in region 67 as defined by splitter 68. The conductive material now falling from rotor 65 has been cumulatively refined to contain carbon and calcium oxide and passes from separator 48 through conduit 49, while the waste from regions 57, 61 and 67 passes to conduit 50 separately or as a single accumulation. However described, separator 48 has generated, in multiple stages, a physical force which is applied to separate the bed drain material into calcium sulfate as waste in conduit 50, and the recoverable material which can be recycled to the fluidized bed combustor as a calcium-based sorbent and material having a calorific value. Thus, in function, the separator of FIG. 1 performs as does separator 48 of FIG. 3.

Conclusion

The locus of the invention is close to the separator, or one utilizing retention of an electrostatic charge on the surface of the comminuted bed drain material. The force generated on the mixture of materials in the bed drains has its genesis in electrical energy, the final manifestation of the force being physical in moving the selected unreacted sorbent to a collection point from which it can be recycled into the maw of the fluidized bed combustor.

Once the bed drain material is passed to a selected type of separator, a particular processing train is established to deliver the material for the dry separation. There are several common denominators of units within each processing train. For example, the heat of the bed drain material is scavenged back into the thermal process of the combustor. Secondly, each processing train has a comminuting unit with which to break out the unused portion of the sorbent in anticipation of its separation. A screening unit is probably advisable in both processing trains to eliminate fines which would clog any type of separator. Finally, some type of drying unit is probably desired so the mixture may approach the separation stage without the burden of moisture. There remains distinctions between the processing trains in that different forms of additives are required to enhance the affect of the individual characteristics of the forces generated within each separator.

After the separated unreacted sorbent is discharged from the separators, there will be a common denominator of handling the sorbent. In both cases, pelletizing the unreacted sorbent is probably desirable to render the sorbent physically compatible with the combustion process. It is visualized that the recovered partially reacted sorbent will be mixed with fresh sorbent, stored and delivered to the bed of the combustor. As has been implied, within the sweep of this processing train within each embodiment, the essential element of the invention is found in the separation of the unreacted sorbent to render the overall operation of the fluidized bed combustor more efficient.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. In a combustion process the method of extracting sulfur compounds from a carbonaceous fuel in which calcium-based sorbent is intimately associated with the carbonaceous fuel from which sulfur compounds are extracted by adsorption into the surface of the sorbent particles, including, draining from the process a mixture of the carbonaceous fuel from which sulfur compounds have been extracted and particles of the sorbent spent by adsorbing the sulfur compounds which has produced an outer shell on the sorbent particles around unreacted sorbent, comminuting the particles of spent sorbent to fracture their spent shells and release the unreacted sorbent, exposing the mixture including spent sorbent shells and unreacted sorbent to an electrically generated physical force to significantly separate the unreacted sorbent from the mixture, returning the unreacted sorbent to the combustion process for intimate association with the carbonaceous fuel for additional adsorption service, and disposing of the remaining mixture as waste.

2. The method of claim 1, in which, the mixture of unreacted sorbent and spent sorbent shell material is magnetically separated.

3. The method of claim 1, in which, the mixture of unreacted sorbent and spent sorbent shell material is electrophoretically separated.

4. The method of claim 3, including, coating the mixture with a material selected from oils and fatty acids and amines which will enhance electrophoretic separation.

5. A system for scavenging unreacted sulfur sorbent from bed drains of a fluidized bed combustor which intimately associates a calcium-based sorbent with sulfur-containing coal, including, a fluidized bed combustor drain through which is removed a mixture of partially reacted calcium-based sorbent and unburned coal and other material, a heat exchanger connected to the drain to receive the mixture of material from the fluidized bed to scavenge heat of the mixture for return to the fluidized bed combustor, a crusher connected to the heat exchanger to receive the cooled mixture of bed drains and comminute the material of the mixture to expose unreacted sorbent available for continued use in the fluidized bed combustor, a separator structure connected to the crusher to receive the materials of the mixture and generate a physical force from electrical energy to separate the unreacted sorbent from the remaining materials of the mixture, and means for returning the separated unreacted portion of the sorbent to the fluidized bed combustor for additional adsorption of sulfur compounds of combusting coal.

6. The system of claim 5, in which, the physical force generated by the separator is a magnetic field for separating the unreacted sorbent from the mixture.

7. The system of claim 5, in which, the physical force generated by the electrical energy of the separator is electrophoretic for separating the unreacted sorbent from the mixture.

* * * * *